Nov. 26, 1940.   V. H. FRAENCKEL   2,222,898
HIGH-FREQUENCY APPARATUS
Filed Dec. 30, 1938    2 Sheets—Sheet 1
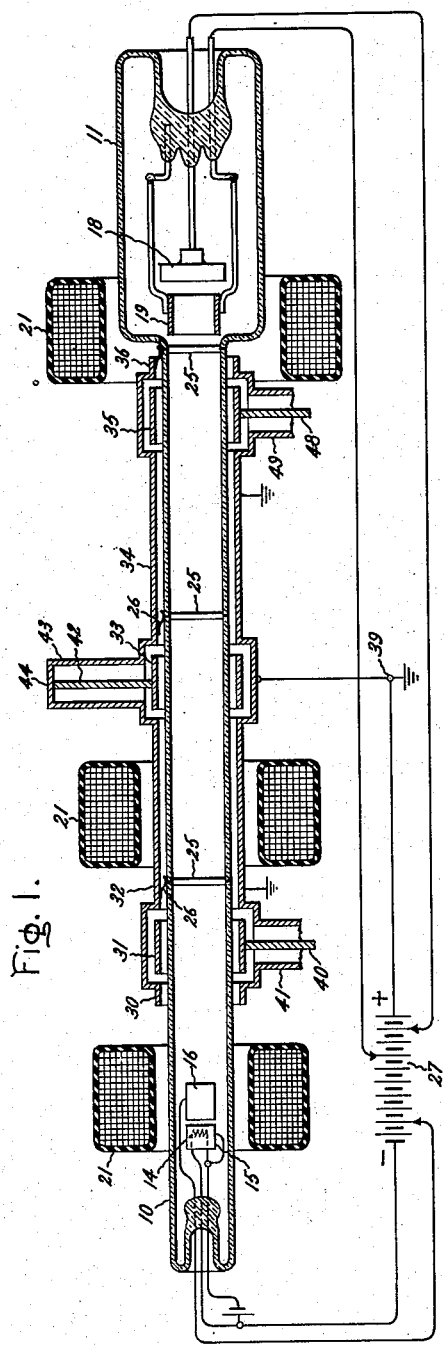
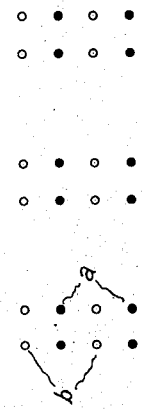
Inventor:
Victor H. Fraenckel,
by Harry E. Dunbar
His Attorney.

Nov. 26, 1940.                V. H. FRAENCKEL                2,222,898
                         HIGH-FREQUENCY APPARATUS
                         Filed Dec. 30, 1938           2 Sheets-Sheet 2
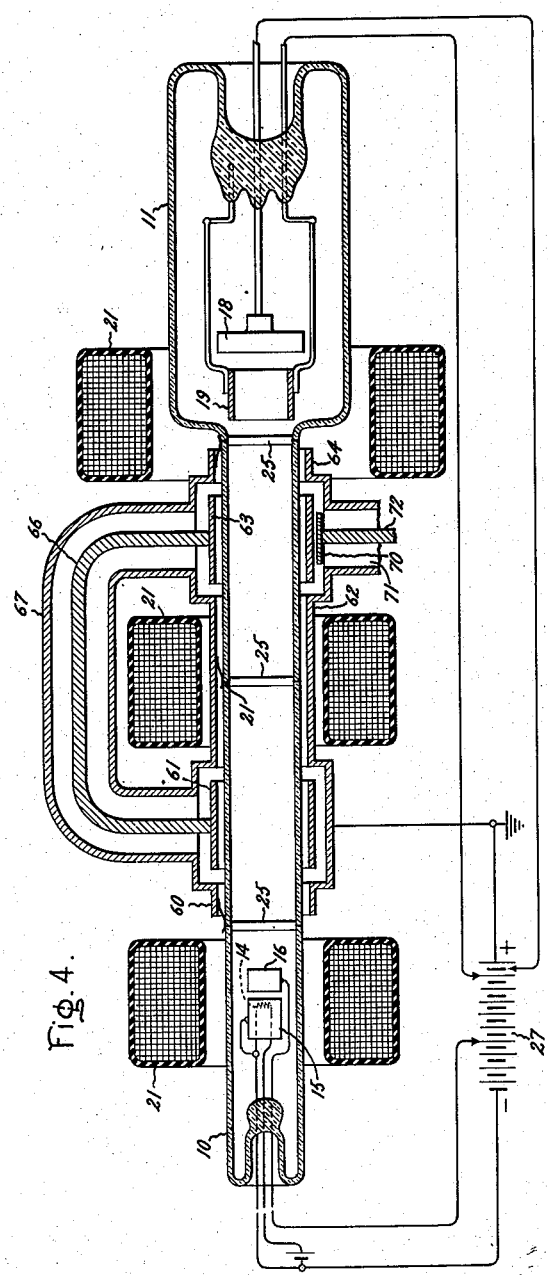
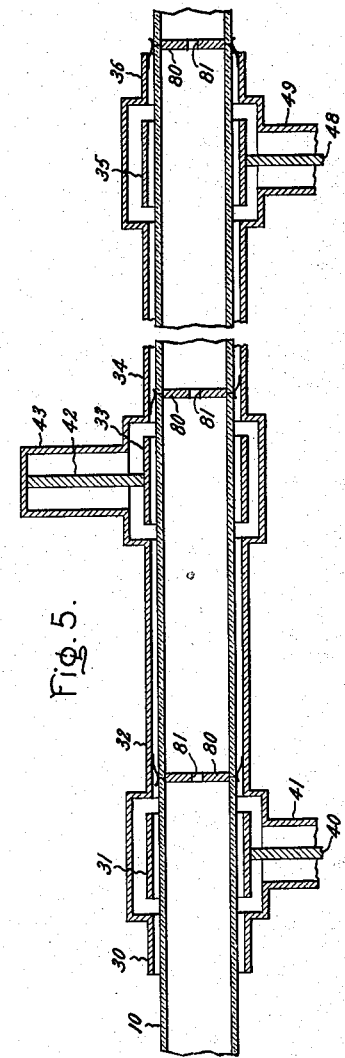
Inventor:
Victor H. Fraenckel,
by Harry E. Dunham
His Attorney.

Patented Nov. 26, 1940

2,222,898

UNITED STATES PATENT OFFICE 2,222,898

HIGH-FREQUENCY APPARATUS

Victor H. Fraenckel, Schenectady, N. Y., assignor to General Electric Company, a corporation of New York Application December 30, 1938, Serial No. 248,527

7 Claims. (Cl. 250—27)

This invention relates to improvements in the construction of high-frequency discharge devices.

In application Serial No. 153,602, W. C. Hahn and G. F. Metcalf, filed July 14, 1937, there is described an ultra-high frequency discharge device in which power conversion is accomplished by producing velocity variations in an electron beam in accordance with a desired modulation pattern and by thereafter abstracting power from the modulated beam according to certain novel principles fully set forth in the application.

The tube constructions described by Hahn as exemplifying his invention utilize an arrangement in which the electrode structure for producing the beam, the means for modulating the beam and taking power from it, and the electrode for collecting the beam are all assembled in a common container.

It is an object of my present invention to produce improvements in this construction which will facilitate handling large amounts of high-frequency power and which will otherwise widen the application of the Hahn invention. To this end, I provide an arrangement in which the means for producing the electron beam is enclosed within an evacuated envelope while the electrode system for modulating the beam and for otherwise affecting it at high frequency is wholly outside the envelope. This construction has the particular advantage, among others, that the high frequency electrode system may be adjusted and varied at the will of the operator without the need for disturbing in any way the vacuum tube in which the beam is produced. Furthermore, in case of breakage, the tube itself may be readily removed from the apparatus assembly and replaced without first dissembling the high frequency elements.

An important feature of the invention consists in an arrangement by which the internal electrode system is divided into two distinct parts, namely, an electrode for collecting the beam and an electrode combination entirely independent of the beam collector for fixing the velocity of the beam within the region in which high frequency effects are to be produced. This arrangement permits the collecting electrode to be operated at a potential at which it performs its intended function with maximum efficiency and at the same time allows the beam velocity to be held at an optimum value.

The features which I desire to protect herein are pointed out with particularity in the appended claims. The invention itself, together with further objects and advantages thereof, may best be understood by reference to the following description taken in connection with the drawings, in which Fig. 1 shows an amplifying device embodying the invention; Figs. 2 and 3 are imaginative representations useful in explaining the operation of the device of Fig. 1; Fig. 4 illustrates the further application of the invention in connection with an oscillator; and Fig. 5, which is partly broken away, shows a structural variation of the device of Fig. 1. Inasmuch as my present invention is considered to be primarily applicable to discharge devices of the character described and claimed in the aforesaid W. C. Hahn application it will be helpful to refer briefly to some of the principles utilized in such devices.

An electron stream such as flows between the electrodes of a vacuum tube may be modulated either as to "electron velocity" or as to "charge density." The first type of modulation involves the production of systematic regularities in electron velocity from point to point along the stream. The second involves the production of charge density variations, such variations being manifested as systematic irregularities in the electron grouping.

In the conventional design of electronic discharge devices no distinction is made between these two types of modulation. In connection with the ultra-short-wave devices, however, it is advantageous to utilize modulating electrodes which are capable of producing velocity modulation without simultaneously causing appreciable charge density variations. For reasons which need not be elaborated here this expedient avoids the large input losses which are observed with conventional prior art devices when they are operated at extremely high frequencies. By additional means also described in the aforesaid Hahn application, velocity modulation produced as above specified may be subsequently converted into charge density modulation of a higher order of magnitude so as to produce amplification effects.

My present invention comprises constructional improvements in apparatus utilizing the principles outlined in the foregoing. Referring to Fig. 1, I have exemplified these improvements in connection with an amplification device which embodies the invention of the aforesaid Hahn et al. application S. N. 153,602 and also utilizes certain additional principles more particularly described in W. C. Hahn application S. N. 211,-124, filed June 1, 1938.

The arrangement shown comprises an electron beam tube of the cathode ray type which includes an evacuated envelope having an elongated tubular portion 10 of length on the order of ten times its diameter. This portion, which is of uniform diameter, connects at one end with an enlarged electrode-containing portion 11. The envelope may be suitably constituted of glass, quartz, or any equivalent insulating material.

The tubular portion 10 encloses at one end means, such as a known type of electron gun, for producing an electron beam. The combination shown comprises a cathode 14, which is indicated in dotted outline, and a focusing cylinder 15 for confining the electrons from the cathode to a concentrated beam. This cylinder may be either connected directly to the cathode or maintained a few volts negative or positive with respect to it. In order to accelerate the electrons to a desired extent there is provided an accelerating electrode 16 which is spaced from the cathode and which may be biased to a suitable positive potential say, several hundred volts.

At the other end of the envelope there is provided an anode 18 which is adapted to collect the electron beam after it has traversed the tubular envelope portion 10. A ring-like electrode 19 in the nature of a suppressor grid serves to prevent secondary electrons emitted by the anode 18 from returning to the discharge space.

In the operation of the device the anode 18 should be maintained at a potential one to several thousand volts above the cathode, and the suppressor grid 19 should be biased fifty to several hundred volts negative with respect to the anode. These potential relationships may be established by means of a suitable voltage source, conventionally represented as a battery 27.

In order to handle relatively large amounts of power it is necessary that the electron beam traversing the envelope have a considerable current value, say, on the order of 100 to 1000 milliamperes. In view of the strong tendency of such a beam to separate or disperse by virtue of the mutually repulsive forces exerted by the electrons in the beam it is necessary to provide some means for confining it to the proper path. For this purpose I provide a series of magnetic field-producing coils 21 arranged co-axially with the envelope at various points along its length. These are energized with direct current and serve to confine the electrons to a pencil-like beam extending between the cathode and the collecting electrode 18.

In the present connection it is also desired that the average velocity of the beam be substantially constant along its length. However, some difficulty is experienced in realizing this condition, due to the tendency of the glass wall surfaces of the tube 10 to become charged. In some cases a variation in beam velocity as great as 2000 volts or more may be caused by local charging of the glass.

This trouble is substantially overcome by providing a series of apertured electrodes 25 spaced along the interior of the envelope. These electrodes, which are preferably spaced on the order of four inches or less, may comprise rings of conducting material applied to the interior of the envelope wall surface. They are maintained at a fixed and uniform potential by means hereinafter to be described.

The combination of elements so far described comprises means for producing a unidirectional electron beam of substantially constant average intensity and velocity. In addition to such means there is provided an electrode system for modulating the beam at high frequency and for abstracting power from the modulated beam. In accordance with my present invention this electrode system is wholly outside the envelope.

The electrodes which make up the system include a series of sequentially arranged conductive tubular elements which concentrically surround the envelope portion and which are respectively numbered 30 to 36 inclusive. As will be more fully explained hereinafter, the longitudinal dimensions of these elements should be correlated to the beam velocity and to the desired operating frequency of the apparatus. The tubular elements which have even numbers are connected together by metallic parts which bridge the odd numbered elements. By this means the said even-numbered elements may be maintained at a common potential. For the particular circuit connection illustrated these uni-potential parts are grounded as indicated at 39 and are connected to the positive terminal of the battery 27.

The tubular elements 31, 33 and 35, on the other hand, constitute electrodes which are capable of varying in potential at ultra-high frequency with respect to the fixed potential parts 30, 32, 34, and 36. Thus, they comprise means for producing variable potential gradients acting longitudinally on the beam at a plurality of points along its path. Between these points the potential level is maintained substantially constant by the shielding effect of the tubes 32 and 34.

The presence of a uni-potential structure extending along substantially the entire length of the envelope may be made use of in fixing the voltage of the spaced interior electrodes 25. This is accomplished by the provision of conductors extending through the lateral walls of the envelope and providing direct electrical connections between the interior electrodes 25 and the parts of the external electrode system which are at fixed potential. As shown, these conductors include flexible contact elements 26 which make frictional contact with the interior surfaces of the tubes 32, 34, and 36. Although the latter tubes are grounded, the fact that the cathode 14 is operated several thousand volts below ground means that the electrodes 25 represent regions of high potential as far as the electron beam itself is concerned.

In order that the principles of velocity modulation as described by Hahn may be satisfactorily applied in this connection the potential of electrode 31 should be alternately raised and lowered with respect to the adjoining extremities of the tubular elements 30 and 32. A control potential for accomplishing this result may be applied to the electrode 31 from any desired source such, for example, as a high frequency oscillator (not shown). As a means for connecting this potential to the control electrode structure, a concentric transmission line comprising an inner conductor 40 and an outer conductor 41 may be employed.

The modulating effect produced will be most pronounced if the length of the tubular electrode 31 is so correlated to the velocity of the beam that the electron transit time therethrough corresponds at least approximately to a half-cycle of the control potential or to an odd number of such half-cycles. If this condition is fulfilled, an electron which enters the modulating space when the potential of the control electrode 31 is at a maximum, is accelerated first by the gradient existing between the tube 30 and the electrode, and again as it leaves the electrode a half-cycle later when the electrode potential is at a minimum with respect to the tube 32. Similarly, an electron which enters the modulating space in such time phase as to be retarded by the effect of the control electrode is also retarded as it leaves the electrode.

As a result of these effects the electron beam leaving the modulating chamber is made up of alternate elements, some of which have a velocity above the average of the beam and others a velocity below such average. However, if only weak control potentials are available the velocity modulation produced may be relatively slight. It may be converted into charge density modulation of a higher order of magnitude by a mechanism now to be described.

It will be understood that as the beam issues from the modulating space it comprises alternate groups of slow and fast electrons as suggested by the imaginative representation of Fig. 2. In this figure the black dots $a$ represent fast electrons, and the light dots $b$ represent slow electrons. (At the exit boundary of the modulating chamber the beam is still substantially uniform so far as charge density or electron grouping is concerned.) At a slightly later time, the more rapidly moving electrons will have caught up with the slower electrons and electron bunches will exist from point to point along the beam as indicated in Fig. 3. The resultant succession of charge density maxima and minima corresponds to charge density modulation as hereinbefore defined.

The conversion of velocity modulation, as produced by the electrode 31, into charge density modulation is a matter which in its very nature requires only the elapse of time and the absence of extraneous influences which might tend adversely to affect conditions within the beam. These requirements may be fulfilled by the provision of an electrostatically shielded drift space in which sorting of the electrons can take place. This drift space may comprise, for example, the section of the discharge envelope which is enclosed within the conducting tube 32.

If this tube, which is shown partly broken away in order to economize space on the drawing, is made sufficiently long, a relatively slight degree of velocity modulation may be converted into a much higher order of charge density modulation so that an amplification effect is obtained. However, if the initial control voltage or signal is very small, a single stage of such amplification may still yield an insufficient output. It is, therefore, advantageous to provide additional means by which multistage amplification can be accomplished. In the embodiment shown, this means comprises a second or "modulation intensifying" chamber formed between the opposed extremities of the tubes 32 and 34. Within this chamber there is located the modulating electrode 33.

It will be readily understood that the current variations in the charge density modulated beam traversing the approach spaces which exist between the extremities of the electrode 33 and of the tubes 32 and 34 will induce in the electrode a cyclically varying current of frequency corresponding to the modulation frequency. The magnitude of this induced current will be greatest if the length of the electrode 33 corresponds approximately to the spacing between adjacent charge density maxima and minima in the beam so that the approach of a charge density maximum corresponds with the recession of a charge density minimum and vice versa.

In order that the induced current may be caused to produce the effects desired in the present connection, the electrode 33 and the tubes 32 and 34 (which are both at ground potential) should be connected through a high impedance circuit. In the arrangement illustrated, such a circuit is provided by a resonant transmission line of the concentric conductor type. This may comprise, for example, an inner conductor 42, connected with the electrode 33, and an outer tubular conductor 43 which concentrically surrounds the inner conductor. The inner and outer conductors are directly connected to one another at one end as indicated at 44, so that the point of connection is approximately a quarter-wave length from the open-circuited end of the transmission line; that is, the end to which the electrode 33 is connected.

With an arrangement such as that indicated, the currents induced in the electrode 33 will produce sustained oscillation of the transmission line and will cause a voltage maximum or anti-node to exist at the open-circuited end; i. e., between the electrode 33 and the adjacent extremities of the tubes 32 and 34. This voltage will be of cyclically varying character and will have a frequency determined by the rate of approach and recession of charge density maxima in the beam; that is to say, by the frequency of the initial velocity modulating potential.

By analogy with the operation of the electrode 31 it will be seen that the potential gradients produced by the electrode 33 will necessarily act to cause additional velocity modulation of the electron beam. Furthermore, since the voltage swing of the electrode 33 may be very much greater than that of the input electrode 31, the magnitude of the new velocity modulation is correspondingly larger than that of the initial modulation. Consequently, the future action of the beam may be controlled almost entirely by the modulation produced by the electrode 33.

This modulation at its inception involves only velocity variations in the beam. However, by providing within the tube 34 a further drift space, the velocity modulation may be converted into charge density modulation in accordance with the principles already described. The tube 34 may be of any length required to accomplish the conversion effectively.

In order to abstract energy from the modulated beam, use is made of the additional electrode 35. As in the case of the electrodes 31 and 33 previously described, the electrode 35 is positioned between the extremities of two conducting tubes, namely, the tubes 34 and 36. As explained in connection with the electrode 33, the action of the modulated beam in traversing the electrode 35 is to induce in that electrode currents which correspond in frequency to the modulation frequency of the beam. In order that this effect may be a maximum, the axial length of the electrode should be approximately equal to the spacing between adjacent charge density maxima and minima in the beam. Current induced in the electrode 35 may be fed to a suitable utilization circuit (not shown) through a concentric conductor transmission line comprising an inner conductor 48 and an outer conductor 49.

It will be seen that with the arrangement described the high frequency electrode system is entirely independent of the means by which the electron beam is produced. Since the former, that is, the high frequency electrode system, is outside the evacuated envelope it may be varied and adjusted at the will of the operator without having to disturb the beam-producing means in any way. This is particularly advantageous when it is realized that the dimensions of the high frequency electrodes must be correlated to the velocity of the beam and to the desired frequency of operation. Once these dimensions are fixed it is difficult to change the operating frequency of the system by any means other than a change in the electrode structure. Such changes are obviously facilitated by the illustrated arrangement in which the high frequency electrodes are at all times completely accessible to the operator.

Furthermore, the uniform diameter of the tubular envelope portion 10 and the fact that it interfits loosely with the high frequency electrode system, permits it to be withdrawn for repair or replacement in the event that it ceases to be properly operative for any reason. Thus, a considerable saving may be realized by not having to scrap the structure as a whole when only the vacuum tube proves defective.

I have so far described my invention primarily in its application to an amplifying device. It should be understood, however, that it is equally applicable to high frequency apparatus for any use, and in Fig. 4 I have shown its application in connection with a type of oscillator which is described in Hahn application S. N. 211,123 filed June 1, 1938. In this case the beam-producing means is of the same general character as that previously described so that parts having corresponding functions are similarly numbered. The high frequency system, however, comprises a series of tubes 60, 61, 62, 63, and 64, which, while similar in form, differ materially in function from those described in the foregoing.

The electrode 61 resembles the electrode 31 of Fig. 1 in that it functions to produce velocity modulation of the electron beam traversing the envelope 10 in response to variations in potential impressed on the electrode. Furthermore, the space enclosed by the tubular conductor 62 serves as a drift space within which velocity modulation produced by electrode 61 may be converted into charge density modulation in accordance with the principles previously described.

In this case, however, the action of the modulated beam in affecting the electrode 63 is reflected back to the electrode 61 by means of a concentric conductor transmission line to which the electrode 63 is coupled. This line comprises an inner conductor 66 and an outer conductor 67, these being of a length corresponding to a half-wave length at the desired frequency of operation of the system. The resonant circuit thus formed is excited to oscillation by the potential variations of the electrode 63 as induced by the action of the modulated beam. By virtue of the feed-back action thus produced, the system is maintained in self-sustained oscillation.

In order that power may be taken from the oscillator, there is provided an output electrode 70 which is positioned adjacent to the electrode 63 so as to be capacitively coupled thereto and which is connected to a utilization device such as an amplifier (not shown). A pair of concentric conductors 71 and 72 may comprise the means by which the connection is made.

In Fig. 5, there is shown an alternative construction of the intermediate electrodes which has special advantages in certain cases. The high frequency electrode system, which is also shown, has the same arrangement as in Fig. 1 and bears the same reference numerals.

In this embodiment the intermediate electrodes are in the form of apertured conductive disks 80 (e. g. of metal) having relatively small central openings 81, corresponding in size to the desired diameter of the electron beam. They are respectively positioned between the various high frequency electrodes, and serve to avoid electronic coupling between such electrodes except by electrons which follow the main beam path. Specifically, the disks 80 prevent stray electrons from moving in the reverse direction along the inner surface of the tube 10 and thereby inducing self-sustained oscillations due to the resultant back-coupling between adjacent high frequency electrodes. They are maintained at fixed potential by means of external connections as described in connection with the electrodes 25 of Fig. 1.

I wish to point out that I make no claim to the particular combination of electrodes by which amplification effects are obtained in the device of Fig. 1 or by which oscillation effects are obtained in the device of Fig. 5. Both these combinations are the inventions of W. C. Hahn, and are respectively claimed by him in his applications S. N. 211,124 and S. N. 211,123 hereinbefore referred to. My contribution to the apparatus shown lies in an arrangement of the parts thereof by which the means for producing an electron beam is physically separated from the high frequency electrode system, and in the other structural features which are specified in the claims appended hereto.

What I claim as new and desire to secure by Letters Patent of the United States is:

1. High-frequency apparatus comprising an evacuated tubular envelope, a direct current electrode system including an electron emitter and an anode for respectively producing and collecting a concentrated electron beam which axially traverses the envelope, a plurality of spaced electron-permeable electrode elements separate from and interposed between the said electron emitter and the anode within the envelope for defining an extended region of fixed average beam velocity, and a high frequency electrode system mounted externally of the envelope within the limits of the said region of fixed beam velocity, said high-frequency electrode system having the dimensions of its component parts in a direction parallel to the enevelope axis correlated to the beam velocity which is maintained within the said region to assure effective mutual reaction between the beam and the system for a particular frequency of operation.

2. High-frequency apparatus comprising an evacuated tubular envelope, a direct current electrode system including an electron emitter and an anode for respectively producing and collecting concentrated electron beam which axially traverses the envelope, a plurality of spaced electron-permeable electrode elements separate from and interposed between the said electron emitter and the anode within the envelope for defining an extended region of fixed average beam velocity, means connecting with said electrode elements for maintaining the velocity of the beam within said region fixed at a desired value, a high frequency system wholly external of the envelope and including a series of axially spaced conducting members encircling the envelope in a region substantially coextensive with the said region of fixed beam velocity, and means forming a part of the high frequency system for developing cyclically variable potential gradients which cause the occurrence of modulating and energy-abstracting effects at the gaps which exist between the various conducting members.

3. High-frequency apparatus comprising an elongated envelope, a direct current electrode system including an electron emitter and an anode for respectively producing and collecting a concentrated electron beam which axially traverses the envelope, means including a plurality of spaced electron-permeable electrode elements separate from and interposed between the said electron emitter and the anode within the envelope for defining a region of substantially uniform average beam velocity, means connecting with said electrode elements for maintaining the velocity of the beam within said region at a desired value, a high frequency electrode system external of the envelope and including a series of slightly spaced hollow metal cylinders which encircle the beam in end-to-end relationship within the limits of the said region of uniform beam velocity, the axial dimensions of the said cylinders being correlated to the beam velocity maintained within the said region to assure effective mutual reaction between the electrode system and the beam for a desired frequency of operation of the apparatus.

4. High-frequency apparatus comprising an elongated evacuated envelope, a direct current electrode system including an electron emitter and an anode arranged at opposite extremities of the envelope for respectively producing and collecting a concentrated electron beam, a plurality of spaced electron-permeable electrode elements separate from and interposed between the electron emitter and the anode within the envelope for defining a region of fixed beam velocity, a high frequency electrode system external of the envelope and including a series of axially spaced conductive members which encircle the envelope in a region substantially coextensive with the said region of fixed beam velocity, circuit means forming a part of said high frequency system for establishing cyclically varying potential gradients of predetermined frequency across the gaps which exist between the various conductive members, means connecting with said electron-permeable electrode elements for maintaining the beam velocity within the region defined by them at a value adapted to assure effective mutual reaction of the beam and the high frequency electrode system at the said predetermined frequency of operation, and separate circuit means connecting with the said anode for maintaining the same at an effective electron-collecting potential.

5. High-frequency apparatus comprising an evacuated envelope having an elongated tubular shaft portion, a direct current electrode system including an electron emitter and an anode positioned at opposite extremities of the envelope for respectively producing and collecting an electron beam which traverses the said envelope shaft portion, a high frequency electrode system comprising a series of hollow cylindrical metal members arranged in end-to-end relation and loosely embracing the said shaft portion of the envelope so as to facilitate removal of the envelope from the electrode system, the said members constituting a tubular conductive structure which is continuous except for the provision of narrow graps between the members at their extremities, circuit means connecting with certain parts of the high frequency electrode system for fixing the average potential of the said system at a desired value, means forming a part of said high frequency system for producing cyclically variable potential gradients acting longitudinally on the beam at the gaps between the said cylindrical members, spaced ring-like electrodes within the envelope defining between them a fixed potential region which is generally coextensive with the region subtended by the high frequency electrode system and lead-in connections projecting through the lateral walls of the envelope for connecting the said ring-like electrodes with the fixed potential parts of the said high frequency electrode system.

6. High-frequency apparatus comprising an evacuated tubular envelope, a direct current electrode system including an electron emitter and an anode for producing and collecting a concentrated electron beam which axially traverses the envelope, a plurality of spaced electron-permeable electrode elements separate from and interposed between the said electron emitter and the anode within the envelope for defining an extended region of fixed average beam velocity, and a high-frequency system mounted wholly externally of the envelope at a region within the limits of the said region of fixed beam velocity, the said high frequency electrode system including at least two conductive parts which encircle the envelope and which are slightly spaced in the direction of the tube axis to define a narrow gap between them, and means effective during the operation of the apparatus to facilitate the production between the said parts of cyclically varying potential gradients which act longitudinally on the beam at the said gap.

7. High-frequency apparatus comprising an evacuated tubular envelope, a direct current electrode system including an electron emitter and an anode for producing and collecting a concentrated electron beam which axially traverses the envelope, a plurality of spaced electron-permeable electrode elements separate from and interposed between the said electron emitter and the anode within the envelope for defining an extended region of fixed average beam velocity, and a high-frequency system mounted wholly externally of the envelope at a region within the limits of the said region of fixed beam velocity, said high-frequency system providing opposed conductive surfaces which are slightly displaced in the direction of the tube axis and which define a narrow gap between them, and means effective during the operation of the apparatus to produce between the said surfaces cyclically varying potential gradients which act longitudinally on the beam at the said gap.

VICTOR H. FRAENCKEL.